United States Patent [19]

Woods et al.

[11] Patent Number: 5,337,940
[45] Date of Patent: Aug. 16, 1994

[54] COMPOSITE PREFORM AND METHOD OF MANUFACTURING FIBER REINFORCED COMPOSITE

[76] Inventors: Harlan L. Woods, 12 Chapman Rd., Wakefield, Mass. 01880; Richard C. Lewis, 3 Haines Ter., Merrimack, N.H. 03054; Peter Nagy, 106 Pope Rd., Acton, Mass. 01720; Stephen A. Kraus, 909B Ridgefield Cir., Clinton, Mass. 01510

[21] Appl. No.: 943,736

[22] Filed: Sep. 11, 1992

Related U.S. Application Data

[63] Continuation-in-part of Ser. No. 625,479, Dec. 11, 1990, abandoned.

[51] Int. Cl.$^5$ .............................................. B23K 20/02
[52] U.S. Cl. ................................... 228/190; 228/174; 228/175
[58] Field of Search ............... 228/190, 193, 118, 246, 228/248, 174, 175

[56] References Cited

U.S. PATENT DOCUMENTS

| | | | |
|---|---|---|---|
| 3,201,862 | 8/1965 | Gotoh | 228/117 |
| 3,419,952 | 1/1969 | Carlson | 228/190 |
| 3,551,996 | 1/1971 | Sumner et al. | 228/190 |
| 3,936,550 | 2/1976 | Carlson et al. | 428/294 |
| 4,217,157 | 8/1980 | Stoltze et al. | 228/190 |
| 4,697,324 | 10/1987 | Grant et al. | 228/190 |
| 4,746,054 | 5/1988 | Moats et al. | 228/124 |
| 4,782,992 | 11/1988 | Doble | 228/190 |
| 4,896,815 | 1/1990 | Rosenthal | 228/190 |
| 5,184,769 | 2/1993 | Moracz et al. | 228/190 |

*Primary Examiner*—Samuel M. Heinrich

[57] ABSTRACT

Methods for and preforms for making fiber reinforced composites are disclosed. According to the invention, preforms which allow composites to be machined are provided. Also, preforms with a uniform debulking ratio are provided with non-uniform fiber placement. In addition, methods of forming composites have less material waste and allow more than one composite to be consolidated at one time.

22 Claims, 7 Drawing Sheets

COMPOSITE PREFORM AND METHOD OF MANUFACTURING FIBER REINFORCED COMPOSITE

RELATED APPLICATION DATA

This is a continuation in part of U.S. patent application Ser. No. 07/625,479 filed Dec. 11, 1990 by Keck et al., now abandoned.

BACKGROUND OF THE INVENTION

This application relates generally to high strength materials and more specifically to fiber reinforced composites.

Fiber reinforced composites, or more simply composites, are used in many applications where a high strength to weight ratio is desired. Composite materials are used in aerospace applications because of this desirable property. They are also used in a wide variety of other structures such as sporting goods.

Several methods of making composites are known. To make metal matrix composites, fiber is sometimes placed between metal foil. The fiber is woven or held together in sheets by a binder. When the structure, called a "preform", is exposed to heat under pressure, the metal and fiber are consolidated into a composite. The exact temperature and pressure used depends heavily on the specific alloy used to make the composite. The temperature is high enough to soften the metal but below its melting point. For example, for titanium, temperatures between 1400° F. and 2000° F. are used. Pressures sufficient to cause the softened metal to flow around the fiber are applied. Pressures in the range of 10,000 psi to 15,000 psi are conventionally used.

To make shapes such as rings, more complicated techniques are used. U.S. Pat. No. 4,900,599 issued Feb. 13, 1990 to Doble describes a method of making composites in the shape of a disk. U.S. Pat. No. 4,697,324 to Grant et al. describes an alternative method and shows rings made with non-uniform cross sections. U.S. Ser. No. 07/625,479 filed Dec. 11, 1990 in the name of Keck et al. (which is hereby incorporated by reference) describes an improved method of making a metal matrix composites, particularly in the shape of a ring.

It would, however, be desirable to improve the method of manufacturing composites in a variety of ways. It might be desirable to reduce the cost of manufacturing a composite. It might also be desirable to more simply produce a composite with a non-uniform cross section.

SUMMARY OF THE INVENTION

With the foregoing background in mind, it is an object of this invention to provide an improved method of making composites.

It is also an object to provide a method of making a composite with a non-uniform cross section.

It is also an object to provide a composite preform having a non-uniform cross section and uniform debulking ratio over its cross section.

It is a further object to provide improved methods of forming a grooved foil for use in manufacturing a composite.

It is a further object to provide a method of making a composite from sheets of metal foil in a way which reduces waste.

It is yet another object to provide a method of consolidating a plurality of composites simultaneously.

It is another object to increase the fiber density in the finished composite.

The foregoing and other objects are achieved by composites made by forming grooves in a plurality of sheets of metal foil, inserting fiber in the grooves, stacking up the foil sheets and pressing the foil sheets together at elevated temperatures. The grooves may be formed by chemical etching, electrical discharge machining, embossing or by cutting with a ganged slitting saw. Each foil may be an integral sheet or a plurality of pieces cut from one or several different foil sheets to minimize waste. Each of the plurality of foil sheets may have a similar pattern of grooves or a different groove pattern. Where the groove patterns are different, the consolidated composite may have fiber free regions which can be machined away to provide a composite with the desired shape. Alternatively, the groove pattern may be similar, but fiber free regions may be created by omitting fiber from certain regions of the groove in certain foil sheets. Means may then be employed to provide a constant debulking ratio across the composite. In one embodiment several preforms are separated by a spacer and consolidated in a press. After consolidation, the spacer is removed.

BRIEF DESCRIPTION OF THE DRAWINGS

The invention will be better understood by reference to the following detailed description and accompanying figures in which.

DESCRIPTION OF THE PREFERRED EMBODIMENT

Figure 1A:
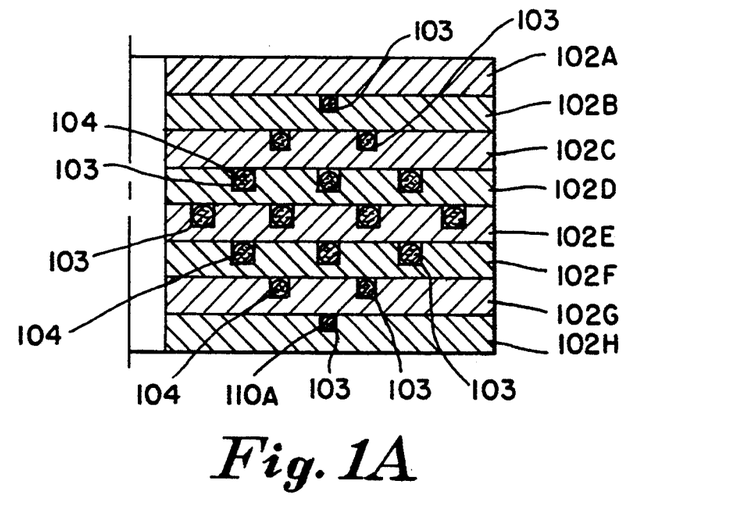
FIGS. 1A and 1B show in cross section composite preforms with non-uniform fiber placement.

FIG. 1A shows in cross section a composite preform. This preform is made by stacking up a plurality of foil sheets 102A ... 102H. Foil sheets 102B ... 102H have grooves 103 (only a portion of which are numbered for clarity) formed in them. Fibers 104 are placed in grooves 103. Silicon carbide fibers are often used in composites, but other fibers, for example boron or carbon, could also be used.

The aforementioned U.S. patent application Ser. No. 07/625,479 describes that fibers 104 are held in place by a fugitive binder. Alternatively, grooves 103 may have sides steep enough to hold fiber 104 in place without a binder.

Figure 1B:
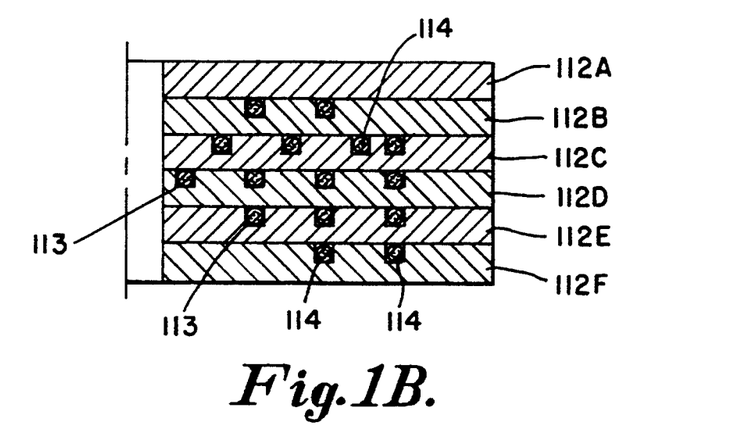

FIG. 1B shows a similar preform made from foil sheets 112A . . . 112F with grooves 113 and fibers 114. By comparison of FIG. 1A and FIG. 1B, it can be observed that the pattern of the grooves 102 in the preform of FIG. 1B is different than the pattern of grooves 113 in FIG. 1B. It will be appreciated that the groove pattern can be selected to provide added fibers in regions of the composite where added reinforcement is required. If it is necessary to shape the consolidated composite by machining away material, no fiber should be placed in regions which will be machined away. Machining away portions of a composite with fiber in them would be undesirable for several reasons. The relatively expensive fiber in those regions would be wasted. Moreover, the machining tools would wear out quickly. Also, fiber ends might be exposed, which can be undesirable.

Figure 1C:
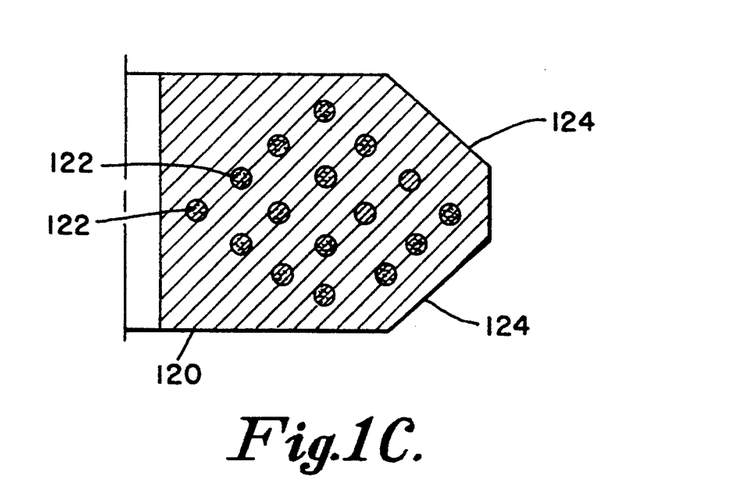
FIG. 1C shows a consolidated composite with a non-uniform cross section.

FIG. 1C shows a consolidated composite 120 made from the preform of FIG. 1A. Surfaces 124 show where material has been machined away.

Sometimes, however, it may not be convenient to make a plurality of foil sheets each with a different groove pattern formed therein. In the forementioned application Ser. No. 07/625,479, grooves were formed in foil sheets by photoetching. In most instances, photoetching involves first making a mask in the pattern of grooves desired. To make foil sheets with different groove patterns, different masks are required. It is sometimes too expensive or undesirable to make numerous different masks. In some photoetching processes, a photo resistive layer is selectively exposed by a computer guided laser rather that using a mask. In such a system, the groove pattern might be more easily varied. However, use of such systems are nonetheless expensive and still create the problem that if each foil sheet is different, the foil sheets must be kept separate prior to being laid up into a composite.

Figure 2A:
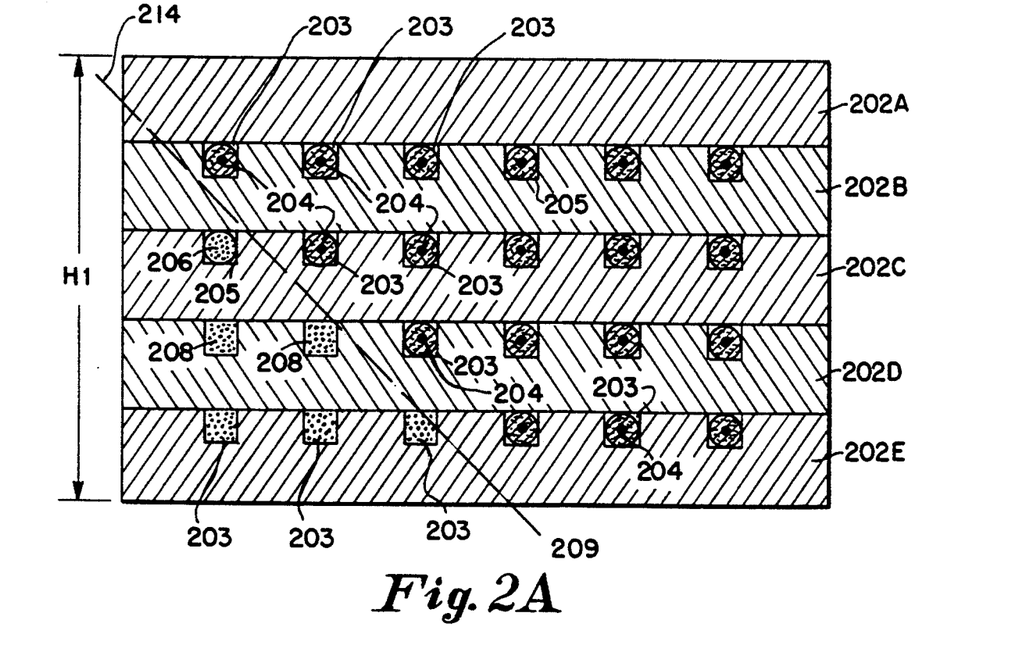
FIG. 2A shows a preform of identical foil sheets which are not uniformly filled with fiber.

FIG. 2A shows how a composite can be made with a fiber free region 209 from a plurality of identical sheets of foil. The preform of FIG. 2A is made from a plurality of sheets of foil 202A . . . 202E. Foil sheets 202B . . . 202E have formed therein a plurality of grooves 203. Fibers 204 are inserted into a portion of the grooves 203. The ones of the grooves 203 without fibers 204 are disposed in a fiber free region 209.

Figure 2B:
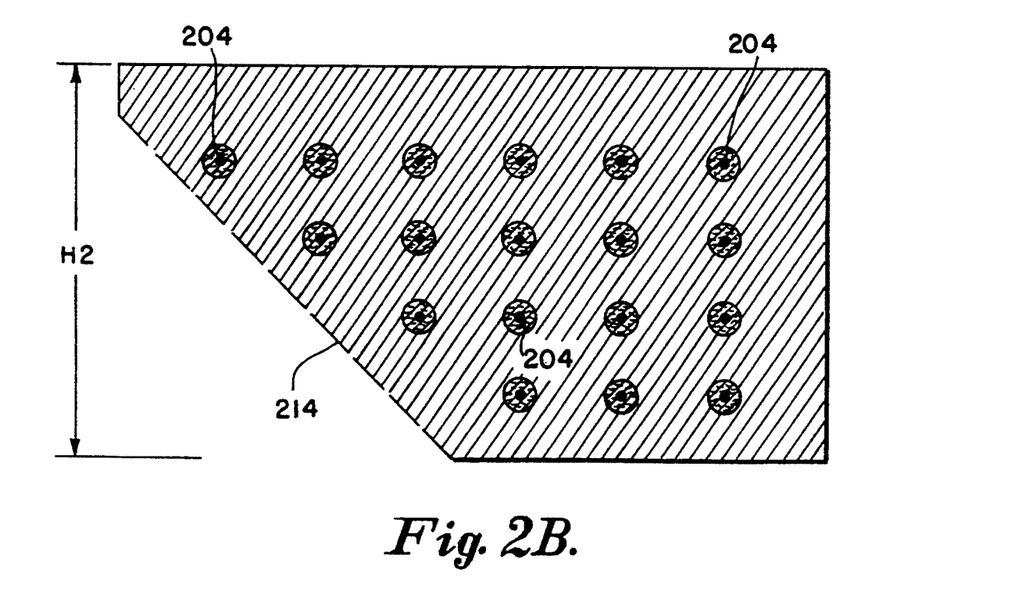
FIG. 2B shows the preform of FIG. 2A consolidated and cut to the desired shape.

As shown in FIG. 2B, when the preform of FIG. 2A is consolidated, it may be machined to line 214 to form a composite with a non-rectangular cross section. As shown in FIG. 2B, the machined composite does not contain voids where line 214 intersects grooves 203.

Voids are prevented because grooves 203 in fiber free region 209 are filled with material which is compatible with the matrix material and will be consolidated into the composite. For example, certain of the grooves 203 are shown filled with metal wire 206. As a second example, others of the grooves 203 are shown filled with metal powder 208. Preferably, the material used to fill grooves 203 is the same material from which foil sheets 202A . . . 202E are formed. However, other materials with similar metallurgical properties could be used.

It is not, however, necessary that fiber free region 209 be machined. It may be desirable in forming some parts to leave a fiber free region. If fibrous reinforcement is not required in some portions of a part, it may be preferable not to use expensive fibers in those regions. Fiber free region 209 can also serve as a point of attachment to the consolidated composite. For example holes could be drilled through that region to receive bolts to bolt the consolidated part to other parts. Alternatively, other parts could be welded or brazed to fiber free region 209.

In comparing FIG. 2A and FIG. 2B, the composite of FIG. 2B has a thickness $H_2$ which is less than the thickness $H_1$ of the preform of FIG. 2A. This decrease in thickness is caused by the fact that, during consolidation, spaces 205 (FIG. 2A) are filled by the material of foil sheets 202A . . . 202E. The elimination of spaces is called "debulking". The ratio of the volume of the preform to the volume of the consolidated composite is called the "debulking ratio".

Where grooves 203 are uniformly spaced across the preform and uniformly filled by fibers 204 of identical diameter, the debulking ratio is uniform across the cross section of the preform. Even when grooves 203 are not all filled with fibers 204, a uniform debulking ratio can be obtained by filling some grooves with some material compatible with the matrix, for example, wire or powder can be used. Preferably, wire 206 and powder 208 occupy the same volume as fiber 204. In this way, the debulking ratio is uniform across the preform.

If the debulking ratio is not uniform across the cross section of the preform, during consolidation matrix material will be forced from the regions of less debulking to the regions of more debulking. This lateral movement of matrix material is undesirable because it can move fibers 204 such that a uniform fiber placement is not achieved in the consolidated composite. Further, to cause the lateral movement of matrix material, extra pressure or a higher temperature must be used in the consolidation cycle. Besides making processing more expensive or lengthy, these process conditions might damage fiber 204. If the debulking ratio is not uniform across the preform, voids may also be introduced in the consolidated composite. Voids are generally undesirable in composites.

Figure 3A:
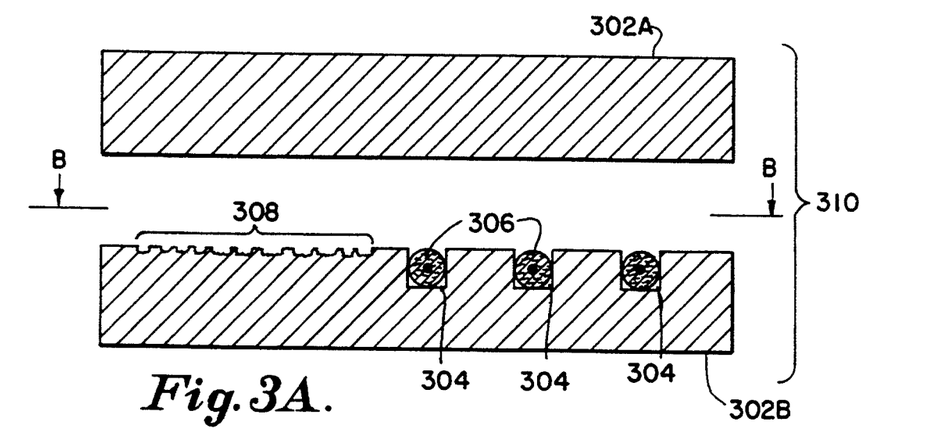
FIGS. 3A and 3B show in cross section and in top view, respectively, a preform with a uniform debulking ratio.
Figure 3B:
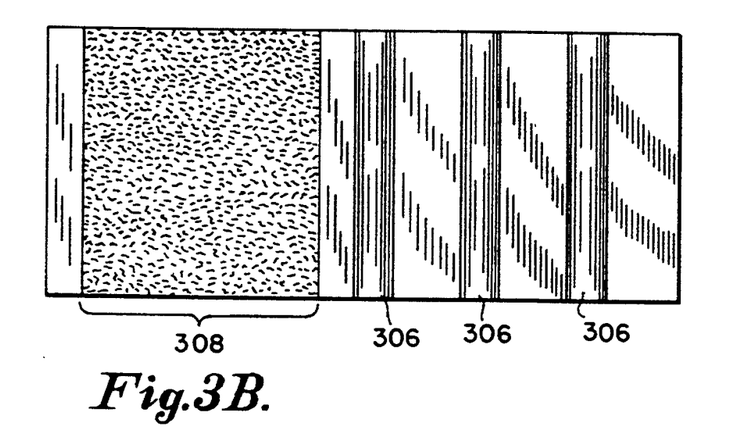

FIG. 3A and FIG. 3B show an alternative way to achieve a uniform debulking ratio across a composite. Layup 310 comprises a foil sheet 302A and 302B. Sheet 302B has grooves 304 with fiber 306 disposed therein. Where no fiber reinforcement is needed, no grooves are formed. To provide a constant debulking ratio, region 308 is speckle milled to remove a volume of material equal to the difference in volume between grooves 304 and fiber 306. Speckle milled region 308 is formed by removing a small amount of foil sheet 302B in a random pattern. Of course, the same amount of material could be removed in any pattern. Possibly, the material in region 308 is removed in the same way as material is removed to form grooves 304. If photoetching is used, however, the material in region 308 and in grooves 304 is removed in separate etching steps because of the different depth of the etching. Laser milling, grinding or other technique to remove material in region 308 could also be used.

Figure 4:
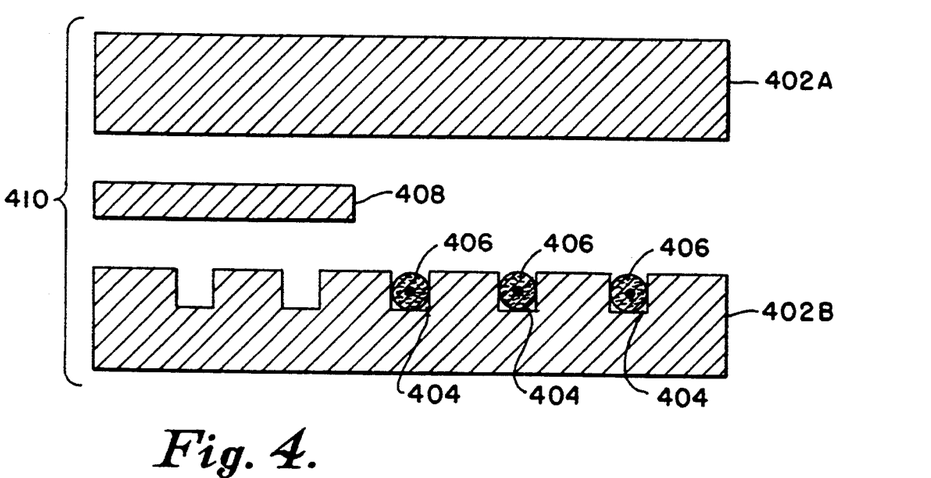
FIG. 4 shows in cross section an alternative embodiment of a preform with a uniform debulking ratio.

The technique of FIGS. 3A and 3B to provide a constant debulking ratio still suffers from the shortcoming that different patterns of grooves must be formed in different foil sheets if different fiber placement patterns are to be used in different layers of a multi-layer preform. FIG. 4 shows an alternative way to provide a uniform debulking ratio.

In preform 410 of FIG. 4, a portion of the grooves 404 in foil sheet 402B are filled with fiber 406. A separate foil sheet 408 is disposed above those grooves which do not contain fiber 406. The volume of foil sheet 408 is selected to be as close as possible to the volume that fiber 406 would occupy if inserted in the grooves below foil sheet 408. Preferably, foil sheet 408 has a volume within 25% of this volume but more preferably within 10%. In this way, matrix material does not need to move laterally in the preform during consolidation to fill the grooves without fibers. Moreover, when a plurality of foil layers are used to make a preform, the grooves in each layer may be identical. However, not all layers need to have the fiber placed in an identical pattern. Ease of manufacture of the composite is achieved because the foil sheets are not differentiated until they are being assembled into a preform.

Figure 5:
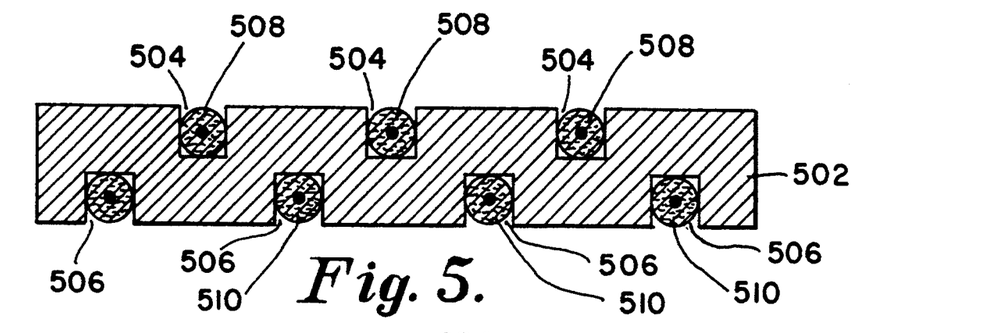
FIG. 5 shows in cross section a foil sheet for use in a preform having grooves on both sides.

In some instances, it may be desirable to have a composite where the ratio of fiber to matrix material is as large as possible. FIG. 5 shows a foil sheet 502 with upper grooves 504 and lower grooves 506. Both upper and lower grooves 502 and 504 are filled with fiber. Grooves 504 and 506 may be placed very close together to provide a high fiber density.

Foil sheet 502 with a two sided groove pattern as shown may also be used even if a high fiber density is not required. In a preform, two sided foil sheets 502 may be interleaved with foil sheets without grooves. In this way, grooves only need to be formed in one half of the foil sheets in the preform. Alternatively, a two sided foil sheet may be used which is twice as thick as a single sided foil sheet. In this way, half the number of foil sheets are needed. The manufacturing complexity might thus be reduced.

Foil sheet 502 need not be formed by chemical etching. It might be formed by embossing, roll forming or other similar stamping operation. It will be appreciated, however, that if grooves 504 and 506 are formed by embossing, they will not have sharp corners as shown in FIG. 5. Rather, they will have more rounded corners. In such instances, a fugitive binder may be necessary to hold fibers 508 in the grooves in a preform.

One advantage of forming grooves 504 and 506 by a stamping operation is that no material is removed to form the grooves. Metal matrix composites are often formed from titanium or other metals which are very expensive to procure as foils. In a typical composite, around 40% of the volume is occupied by fiber. To make composites by a process which requires material to be removed to form grooves, around 40% of the foil is wasted. With a stamping operation to form the grooves, no such waste occurs. Also thinner foils can be used. Foils as thin as 0.003 to 0.004 inches can be used.

Figure 6A:
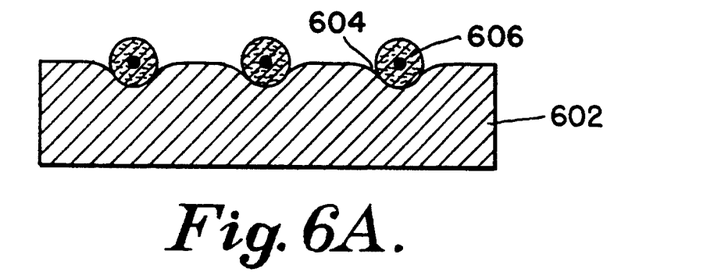
FIG. 6A shows in cross section a foil sheet which has been chemical milled.

Turning now to FIG. 6, a method of forming grooved foils suitable for making composites from fibers with soft coatings is shown. FIG. 6A shows a foil 602 with grooves 604 formed therein. Grooves 604 have gradually sloping walls which are characteristic of grooves formed by chemical etching. There are potential drawbacks with this approach. First, the grooves may not be placed arbitrarily close together. Second, the gradually tapered grooves mean that the fiber 606 does not fit snugly into groove 604. In consolidation, heat and pressure must be used to force the foil 602 to conform to fiber 606. However, too much heat or pressure may damage the fiber.

The problem may be particularly acute if fiber 606 has a soft coating on it. Soft coatings are, for example, particularly useful if the composite is to degrade gradually under stress. Coatings such as niobium or copper have been used for this purpose.

Figure 6B:
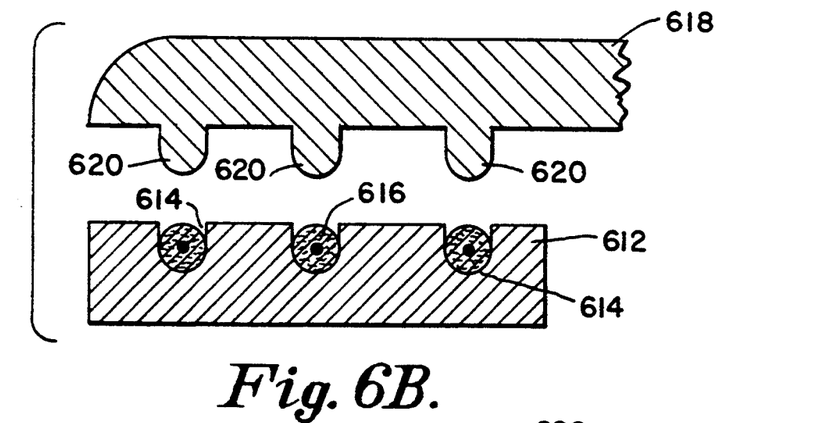
FIG. 6B shows in cross section a foil sheet grooved by electron discharge milling.

FIB. 6B shows a method of forming grooves 614 in foil 612 which conform to the shape of the fiber 615. Here, an electrical discharge machining (EDM) tool 618 is formed with projections 620 in the shape of the grooves to be formed. In electrical discharge machining, EDM tool 618 is charged to a high voltage relative to foil 612. As EDM tool 618 is dragged across foil 612, the electrical discharge from the tool literally blasts away portions of foil 612 where it gets close to tool 618. In this way, precisely shaped grooves can be formed.

Figure 6C:
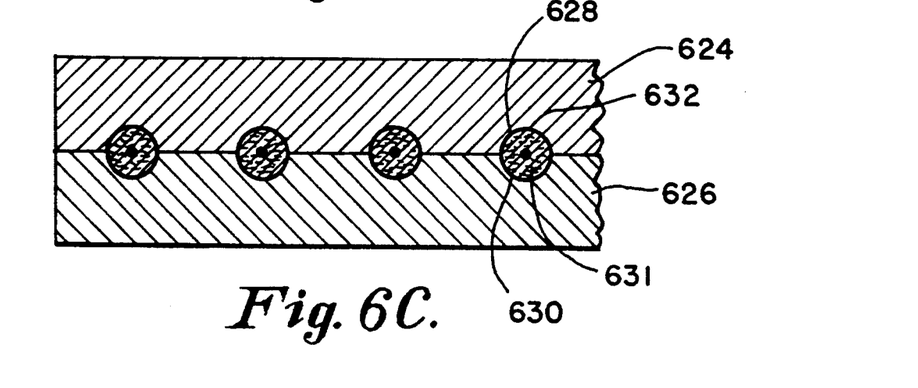
FIG. 6C shows in cross section a preform containing fibers with a soft coating.

FIG. 6C shows that two sheets of foil 626 and 624 may be grooved with grooves 628 and 630, each equal to or slightly larger than one half of a fiber 631. When foils 626 and 624 are positioned with grooves 628 and 630 aligned, fiber 631 is surrounded by foil which conforms to its shape. Such a preform requires a minimum pressure and temperature to consolidate. In this way, coating 632 is less likely to be damaged during consolidation.

This technique is particularly useful for making composites which degrade gracefully under stress. For example, a coating of copper can be placed on a silicon carbide fiber. When placed into a titanium foil sheet as shown in FIG. 6C, the composite may be consolidated at a temperature of 1,650° F. at a pressure of 8 ksi for 6 hours. These pressures and temperatures are below those that would be normally used in consolidating a composite.

Other methods of forming grooves as shown in FIG. 6C could be used. For example, a plurality of saw blades could be mounted on a common shaft. Such a tool, called a "ganged saw", could cut a plurality of parallel grooves simultaneously. If the teeth are curved, grooves in the shape of groove 614 or 630 could be cut. Otherwise, grooves in the rectangular shape of 204, 304, 404 or 504 could be cut as with a traditional saw. In either case, grooves can be cut to conform to the shape of the fiber better and closer together than grooves 604 (FIG. 6A).

It is not necessary, though, that grooves 628 and 630 closely conform to the contour of fiber 631. Advantages can be obtained by making preforms with matching grooves as shown in FIG. 6C. For example, the chemical milling technique depicted in FIG. 6A could also be used. If the groove in each sheet of foil 624 and 626 has a depth equal to half the diameter of a fiber, the gradually tapering edges of the grooves will be approximately half as wide. There, the minimum achievable spacing between fibers is half as much.

In instances where sheets of foil must be aligned when making a preform, it is desirable to include a means for indexing the sheets so that the correct positional relationship between the foil sheets may be maintained. For example, for grooves 632 to align with grooves 630, foil 624 must align with foil 626. To provide the correct alignment, small holes may be punched through foil 624 and 626. Preferably, the holes are near the edge of the foils. Most preferably, the holes overlap the edge. When the grooves are formed in the foil, they should be made in a predetermined relationship to the holes. Then, when the composite is laid up, a pin, such as a graphite rod, can be inserted through the holes in the various foil sheets to ensure there is proper alignment of the sheets.

More than one hole may be formed through each foil sheet to ensure proper alignment. Proper alignment might also be important for forming preforms other than those with matching grooves. For example, when disks with spiral grooves are made as shown in the aforementioned U.S. patent application Ser. No. 07/625,479, the relative orientation of the foil sheets will dictate the relative position of the fibers in various layers. To ensure the desired fiber positions, the same technique may be used. Holes may be punched through each foil sheets and grooves formed with a predetermined relationship to the holes. In laying up the preform, a pin may be placed through the holes to ensure desired orientation between the layers. Once the preform is consolidated, the holes may be machined off the edges of the consolidated composite.

Figure 7A:
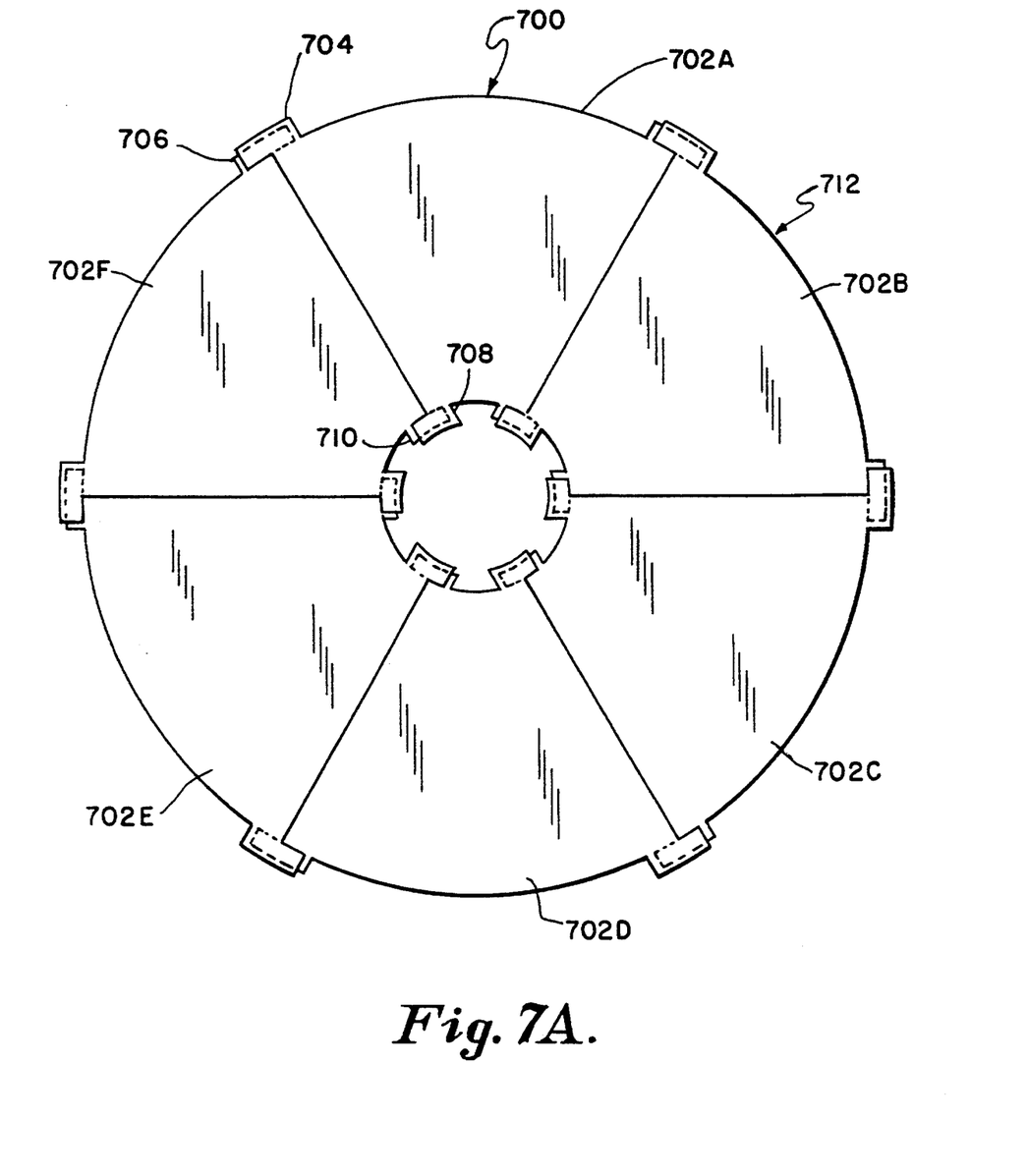
FIG. 7A shows a foil sheet made from a plurality of segments.

Turning now to FIG. 7A, a method of making circular composites with less material waste in shown. It must be recalled that metal matrix composites are made from foils which are very expensive. To cut a circle from a rectangular sheet leaves a significant percent of the foil as waste.

FIG. 7A shows a disk 700 made of a plurality of segments 702A ... 702F. Since disk 700 will be incorporated into a composite, the fact that it is made of several separate pieces is not a detriment. The separate pieces will fuse during the consolidation process. All that is required is that the separate pieces be held in place while grooves are cut in the sheet and the sheets are laid up into a preform and then consolidated.

One method of holding the segments 702A ... 702F together while a preform is made is shown in FIG. 7A. Each of the segments has a plurality of tabs such as 704, 706, 708 and 710 attached thereto. The tabs of adjacent segments are overlapped. For example, tab 704 of segment 702A overlaps tab 706 of segment 702F. The overlapping tabs are then secured such as by spot welding. After consolidation of the composite, the tabs may be machined off. This process assumes the tooling used to hold the preform during consolidation is cut to receive the tabs. Alternatively, the tabs could be cut off before the preform is consolidated. Before the tabs are cut off, though, fiber should be loaded in the grooves and secured with a binder. In this way, the segments will be held together after the tabs are cut off.

Other methods of holding segments together could be used. For example, adjacent segments could be spot welded along their seams without the addition of tabs such as tabs 704, 706, 708 and 710. Electron beam welding can be used for this purpose. Alternatively, the separate segments can be placed in a mold, form, or die which holds them in place until fiber is loaded into grooves.

As described herein, the separate foil segments are secured to each other before grooves are cut in the foil. However, grooves could be formed in the foil prior to securing the segments. If the grooves in the separate segments can be kept adequately aligned, there is no need for the separate segments to be secured together before cutting the grooves.

It is preferable that the separate segments be fused at the same time that the fiber and several foil sheets are consolidated into a composite. It is, however, not necessary. The segments of each foil sheet could be fused into a unitary foil sheet before grooves are cut into the sheet.

Figure 7B:
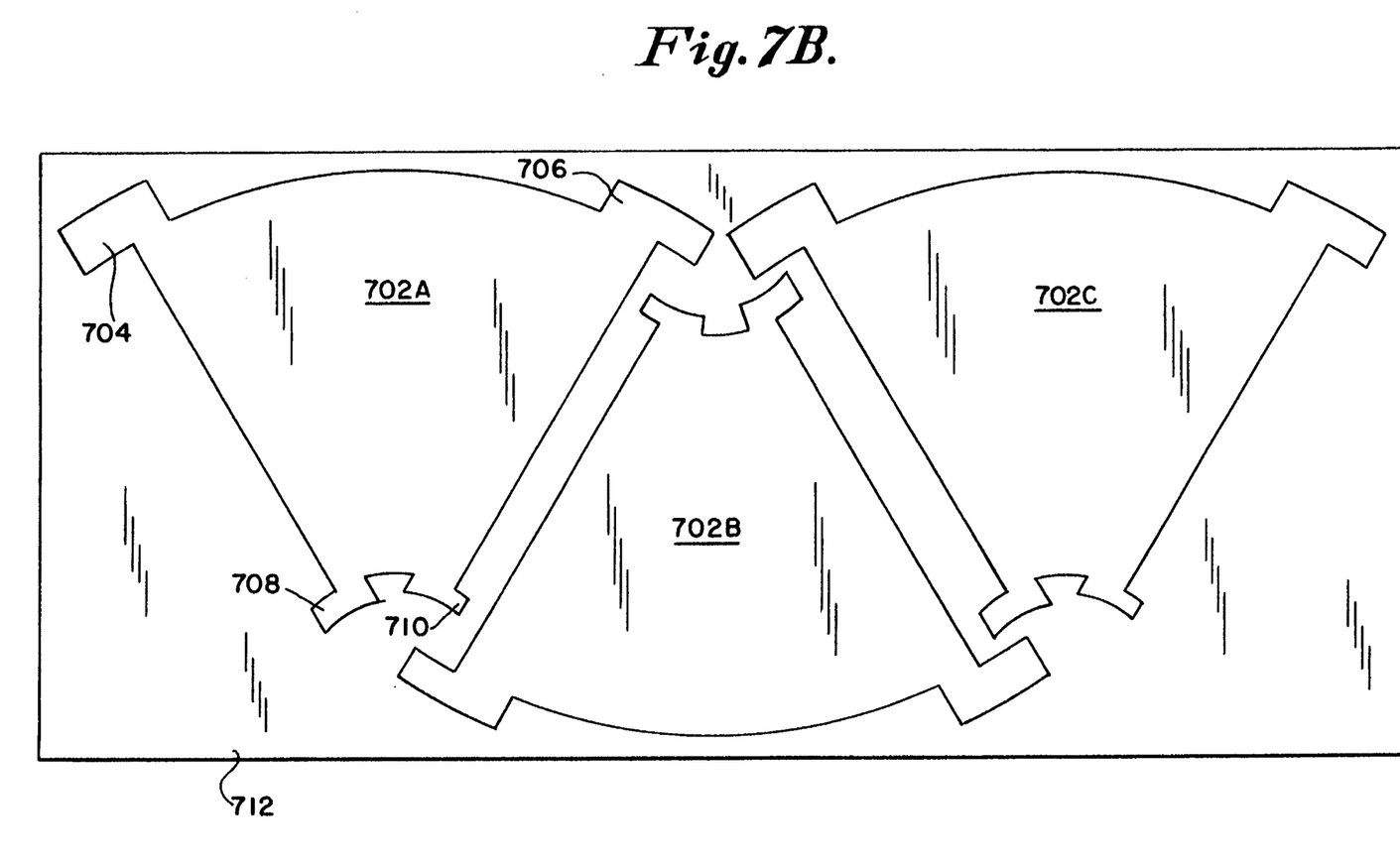
FIG. 7B shows how an integral foil sheet may be cut to form a plurality of segments.

FIG. 7B shows an advantage of constructing disk 700 from a plurality of segments. The individual segments 702A ... 702F can be cut from a rectangle sheet 712 which is too small from which to cut disk 700.

The method of forming foil sheets from a plurality of segments can be beneficially employed whenever the shape of the foil needed to make a preform does not conform to available stock or whenever cutting a sheet of foil in the desired shape would result in significant waste. Large foil sheets or foil sheets with projecting portions can be made in this fashion.

Figure 8:
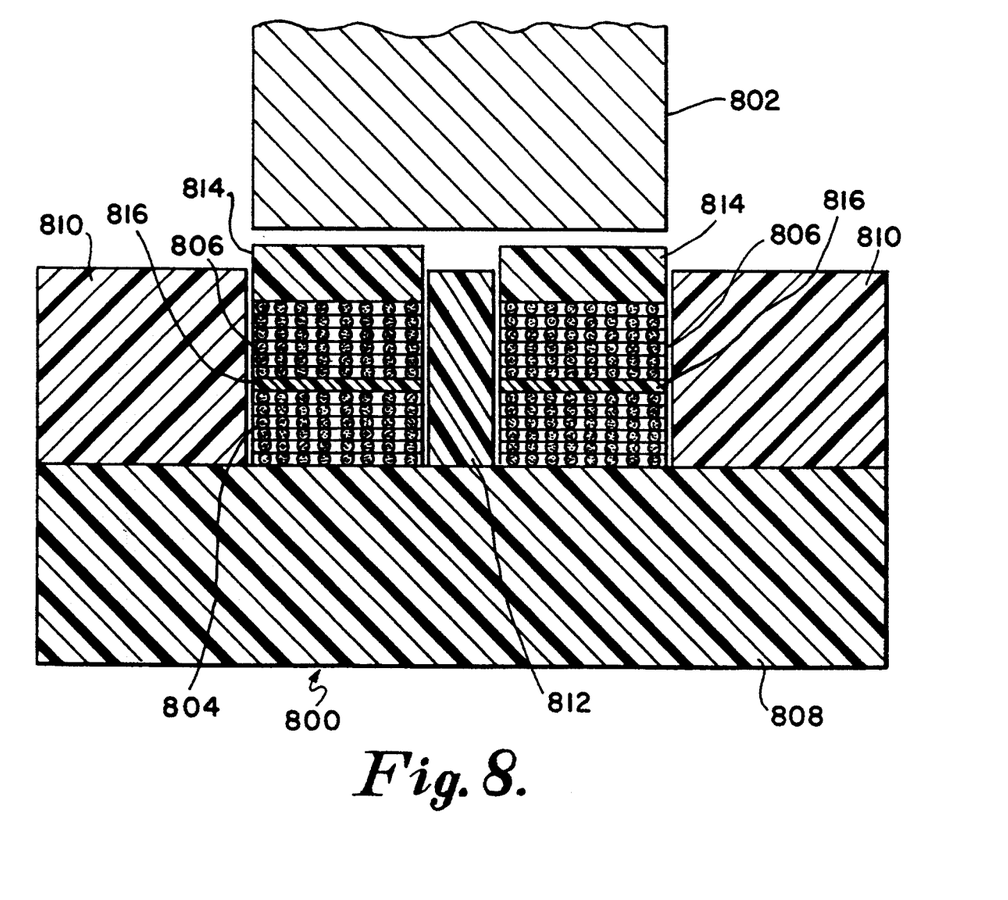
FIG. 8 shows in cross section a plurality of composites consolidated at the same time.

FIG. 8 shows an additional technique for reducing the cost of manufacturing composites. FIG. 8 shows a press 800 having two preforms 804 and 806 disposed therein. Here, annular preforms with plug 812 in the center are shown. As in a conventional press, the preforms rest on a base 808 and are constrained by a collar 818. In operation, piston 802 presses against top plate 814 which in turn compresses preforms 804 and 806. Since press 800 is operated at elevated temperature, base 812, collar 810, plug 812 and top plate 814 are made from some material, such as graphite, which does not react with preforms 804 and 806 during the pressing operation.

In FIG. 8, more than one preform is shown to be consolidated simultaneously. In this way, the number of press cycles is reduced when parts are mass produced. To prevent the separate preforms from being consolidated into a single composite, the preforms are separated by film 816. Film 816 may be made from a single sheet of graphite which will not become consolidated into the composite. Alternatively, film 816 may be made from two sheets of a material which may stick to the composites during consolidation but will not stick to itself. Molybdenum foil may be used for this purpose. If film sheets 816 stick to preforms 804 and 806 during the consolidation process, it may be removed by soaking the consolidated preform in an etching solution which etches away film 816 without degrading the composites. Nitric acid of approximately 50% concentration can be used for this purpose.

Having described various embodiments of the invention, it will be apparent that one of skill in the art could develop alternative embodiments without departing from the invention. For example, metal matrix composites were described, but similar techniques could be used to make ceramic composites. Green state ceramic could be used instead of metal foil. Accordingly, the invention should be limited only to the spirit and scope of the appended claims.

What is claimed is:

1. A method of manufacturing a preform for a composite article comprising the steps of:
   a) forming grooves in a plurality of sheets of foil;
   b) disposing reinforcing fiber in at least a portion of the grooves in at least a portion of the sheet to leave a portion of the grooves which do not contain reinforcing fiber;
   c) disposing material compatible with the foil sheets near the portion of the grooves which do not contain reinforcing fiber; and
   d) stacking the plurality of sheets of foil.

2. The method of claim 1 wherein the compatible material comprises a metal wire.

3. The method of claim 1 wherein the compatible material comprises metal powder.

4. The method of claim 1 wherein the compatible material comprises a second foil sheet disposed on the foil sheet having grooves formed therein.

5. The method of claim 1 wherein the volume of the compatible material is within 25% of the volume the reinforcing fiber would occupy if placed in the grooves which do not contain reinforcing fiber.

6. The method of claim 1 wherein the volume of the compatible material is within 10% of the volume the reinforcing fiber would occupy if placed in the grooves which do not contain reinforcing fiber.

7. The method of claim 1 additionally comprising the steps of
   a) consolidating the preform into a composite; and
   b) machining the consolidated composite in the region containing compatible material.

8. A method of manufacturing a disk having tapered edges comprising the steps of consolidating a preform and machining the consolidated composite according to the method of claim 7 wherein each of the plurality of sheets of foil is circular and wherein the consolidated composite is machined to form tapered edges.

9. A method of manufacturing a preform for a composite comprising the steps of:
   a) forming a plurality of sheets of foil with at least a first region having grooves therein and a second region with recesses formed therein, the recesses having a volume less than that of the grooves; and
   b) disposing fiber in the grooves.

10. The method of claim 9 wherein the step of forming recesses comprises speckle milling the second region.

11. The method of claim 9 wherein the volume of the recesses is within 25% of the difference between the volume of the fiber and the volume of the grooves.

12. The method of claim 9 wherein the volume of the recesses is within 10% of the difference between the volume of the fiber and the volume of the grooves.

13. A method of forming a preform for a composite comprising the steps of:
   a) forming a first foil sheet with grooves in both sides;
   b) disposing reinforcing fiber in the grooves; and
   c) disposing at least one foil sheet above and at least one foil sheet below the first foil sheet.

14. The method of claim 13 wherein the step of forming a first foil sheet comprises stamping grooves into a foil sheet.

15. The method of claim 14 wherein the step of stamping comprises embossing.

16. The method of claim 14 wherein the step of stamping comprises roll forming.

17. The method of claim 13 wherein the first foil sheet has a thickness of less than 0.01 inches.

18. The method of claim 13 additionally comprising the step of consolidating the preform into a composite wherein the composite contains at least 35% fibers.

19. The method of making a preform for a circular composite comprising the steps of:
   a) forming a plurality of arc shaped pieces of foil;
   b) securing the plurality of pieces together to form a circular first foil sheet; and
   c) laying up the first foil sheets with a plurality of other foil sheets.

20. The method of claim 19 additionally comprising the steps of:
   a) forming grooves in the first foil sheet; and
   b) disposing reinforcing fibers in the grooves.

21. The method of claim 19 wherein the step of laying up comprises stacking up a plurality of foil sheets made by securing a plurality of pieces of foil into sheets.

22. The method of claim 19 wherein the step of securing the pieces of foil together comprises electron beam welding pieces together.

* * * * *